UNITED STATES PATENT OFFICE.

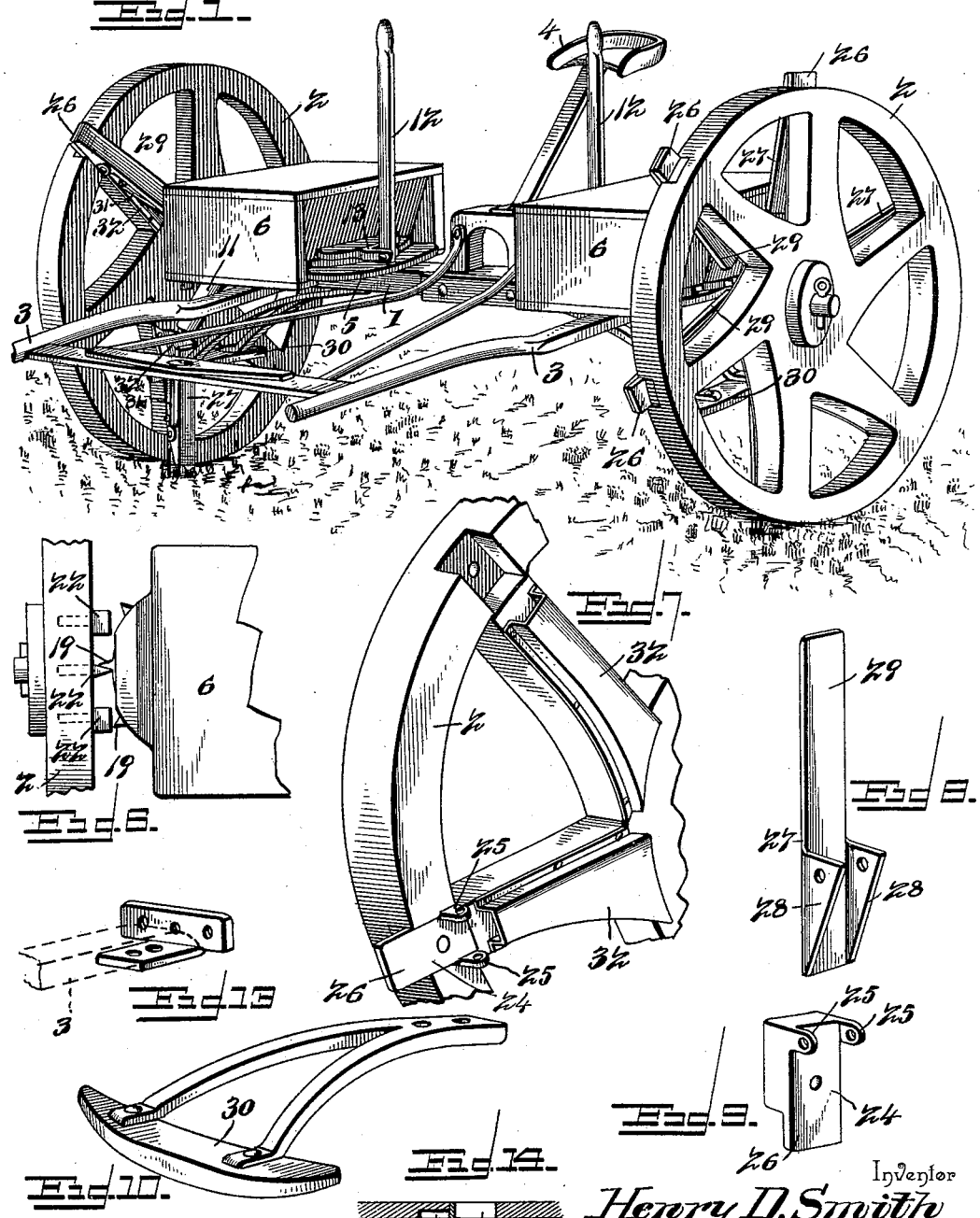

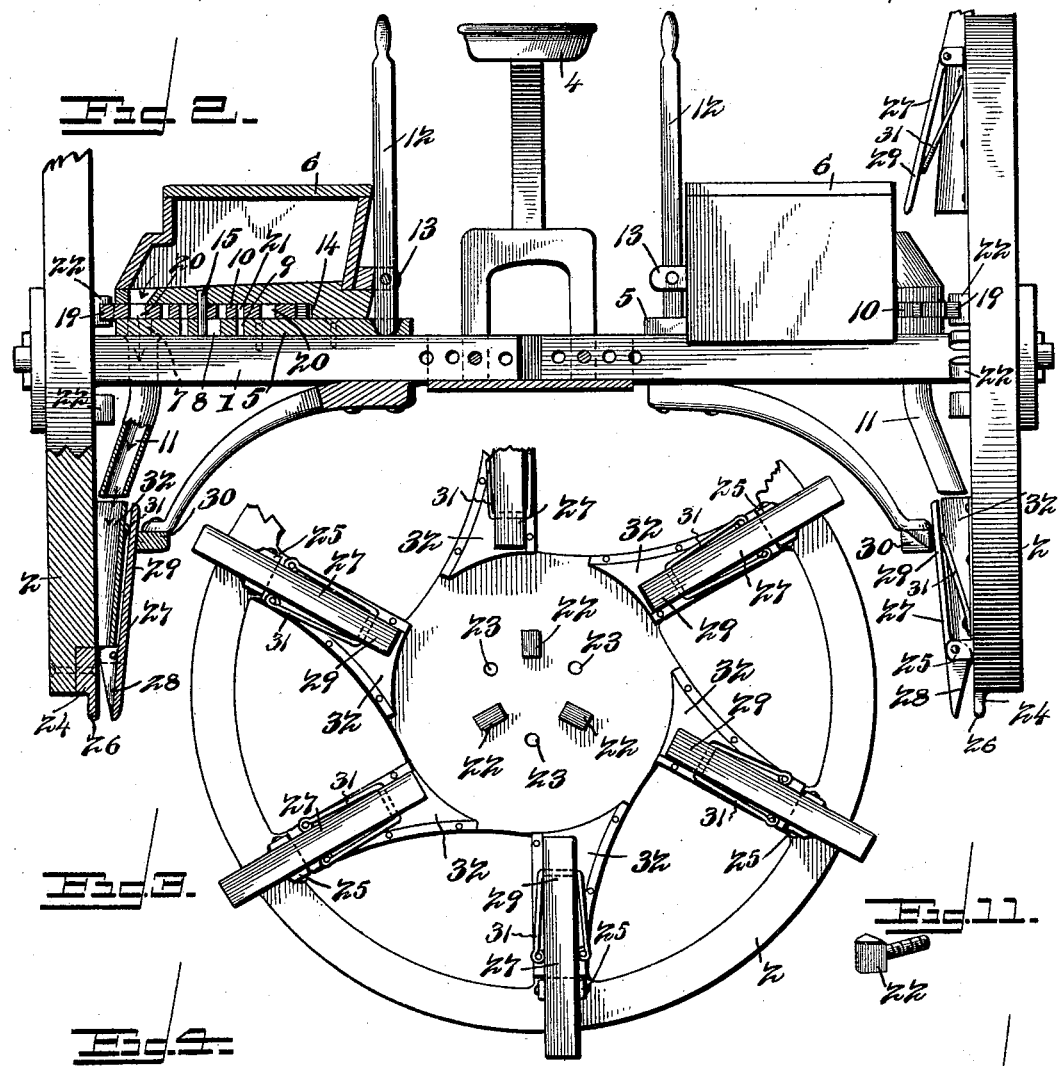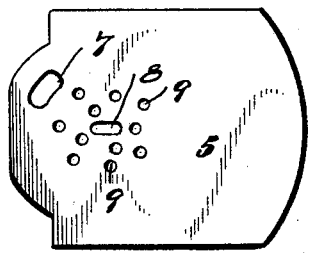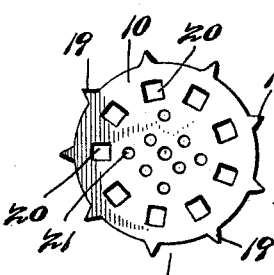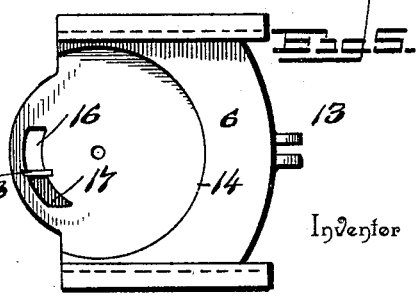

HENRY DAVID SMITH, OF NEWBERN, VIRGINIA.

CORN-PLANTER.

SPECIFICATION forming part of Letters Patent No. 594,437, dated November 30, 1897.

Application filed April 24, 1897. Serial No. 633,748. (No model.)

*To all whom it may concern:*

Be it known that I, HENRY DAVID SMITH, a citizen of the United States, residing at Newbern, in the county of Pulaski and State of Virginia, have invented a new and useful Corn-Planter, of which the following is a specification.

This invention relates to seeding-machines for planting corn or grain in drills or check-rows, and has for its object to provide a planter of this character which will sow the grain with equal ease on level and rolling ground and which will obviate the necessity of providing a furrow opener and coverer, thereby lessening the draft, lightening the machine, and enabling the planter to be placed upon the market at a comparatively small cost considering the character of work and capacity of the machine.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective of a planter constructed in accordance with this invention. Fig. 2 is a rear view thereof, parts being broken away. Fig. 3 is an elevation of a ground-wheel equipped for sowing seed in drills. Fig. 4 is a top plan view of a base upon which a hopper is slidingly mounted. Fig. 5 is a view of a hopper inverted. Fig. 6 is a detail view showing the manner of actuating the seed-dropping plate. Fig. 7 is a detail view of a portion of a ground-wheel, showing the manner of providing the grain-boots. Fig. 8 is a detail view of a flap-valve. Fig. 9 is a detail view of a plate fitted to a side of the ground-wheel rim. Fig. 10 is a detail view of a trip applied to the frame or axle of the planter for operating the flap-valves. Fig. 11 is a detail view of a cog having detachable connection with the ground-wheel. Fig. 12 is a detail view of the seed-dropping plate. Fig. 13 is a detail view of the bracket connection between a thill and the axle. Fig. 14 is a detail view of a portion of the hopper-bottom.

Corresponding and like parts are referred to in the following description and indicated in the several views of the accompanying drawings by the same reference-characters.

The axle 1 is constructed so as to be lengthened and shortened to enable the seed to be planted in rows a greater or less distance apart, and, as shown, it is composed of two parts having their inner ends provided with a series of openings and let into a sleeve or fitted between plates, to which they are adjustably connected by bolts or fastenings of any nature. The ground-wheels 2 are loosely mounted upon the spindles provided at the ends of the axle and have broad tread-surfaces, so as to properly compress the earth when drawn over the field. The thills 3 (see Fig. 13) have adjustable connection at their inner ends with the parts of the axle, so as to admit of the latter being extended or contracted according to the width of the rows, and they are provided with bracket-irons at their inner ends formed with a series of openings to receive the fastenings by means of which the adjustable connection is secured. The driver's seat 4 is mounted upon an arched standard secured to the sleeve at an intermediate point, whereby both hoppers are within convenient reach for throwing the seed-dropping mechanism into and out of gear as required. A plate 5 is secured to each end of the axle and forms a base or support for a hopper 6, which is slidingly mounted thereon to admit of the seeding mechanism being thrown into or out of action. This plate has a discharge-opening 7, an elongated opening 8, and a series of clearing-openings 9 for the escape of seed or other matter finding its way between the plate 5 and the seed-dropping plate 10. A spout 11 is secured to the plate 5 and its upper end communicates with the discharge-opening 7 and its lower end terminates just short of the plane of the adjacent ground-wheel, so as to deliver the seed to the boots applied thereto. Each hopper 6 is held upon and directed in its movements by the plate 5 in any manner found most convenient, and, as shown, its sides are extended below the bottom to embrace the edges of the plate 5 and have inner extensions to engage with the under side of the said plate, thereby attaining the desired end in a simple and effective way. A hand-lever 12 is fulcrumed to an extension 13 of the hopper-bottom, and its lower end enters an opening provided in the inner end of the plate 5 and is the means for shifting the hopper upon its support 5 to throw the planting mechanism into and out of gear. The bottom side of the hopper-bottom has a recess 14 of a depth and size to comfortably receive the seed-dropping plate 10, which is mounted upon a pin 15, secured to the hopper-bottom and having its lower end operating in the elongated opening 8 of the plate 5. An arcuate slot 16 is formed in the hopper-bottom, near its outer end, and constitutes a discharge-opening for the grain, and a groove 17, forming a prolongation of the slot or discharge-opening 16, is provided in the lower side of the hopper-bottom and comes directly above the discharge-opening 7 and affords clearance for grain which may pass by a flexible strip or brush 18 at the rear end of the slot 16, whereby injury to the said grain is obviated.

The seed-dropping plate 10 is of disk form and is provided at intervals around its circumference with spurs 19 and has a series of openings 20 disposed in a circle near its edge and in position to register with the arcuate slot or discharge-opening 16 for receiving the grain therefrom and conveying it to the discharge-opening 7, and this plate has a series of clearing-openings 21 for a purpose similar to the openings 9. The spurs 19 project beyond the outer end of the hopper to be engaged by cogs 22, applied to the inner side of the adjacent ground-wheel, whereby when the machine is advanced over the field the dropping-plate will be actuated and the seed planted in the manner presently to be described. When the planting mechanism is in gear, the spurs 19 project in the path of the cogs 22; but when out of gear the spurs 19 are withdrawn from the path of the cogs 22, which is effected by moving the hopper inward through the instrumentality of the hand-lever 12, as will be readily understood.

The ground-wheels 2 may be of any desired diameter and formed with any required number of spokes, the latter gradually widening from their outer to their inner ends to conform to the outline of the boots applied thereto, and the middle or hub portion of each ground-wheel is provided with a series of threaded openings 23 to receive the threaded ends of the cogs 22, whereby the latter are enabled to make detachable connection therewith. The rim of each ground-wheel is notched or mortised on its inner side at required points and a plate 24 is secured therein, said plate having ears 25 and provided with a blade 26 to penetrate the ground for the entrance of the grain. A flap-valve 27 is formed with flanges 28 at its longitudinal edges, which with the plate 24 form a space for the passage of the grain, said flanges having pivotal connection with the ears 25 in any convenient way. The flap-valve has an extension 29 to engage with a trip 30, by means of which the flap-valve is opened to admit of the grain detained thereby being released and dropped into the opening formed by the blade 26 and the extremity of the flap-valve. A spring 31 is secured at one end to each spoke of the ground-wheel and its opposite end engages with the flap-valve, so as to hold the latter closed when its extension is not in engagement with the trip 30. A housing 32 of flaring form is secured to the inner side of the spokes and its outer or contracted end registers with the space formed by the flap-valve and plate 24, and this housing, with the spoke, constitutes a boot which receives the grain and directs it to the flap-valve, by means of which it is detained until the proper moment, when it is released by the trip 30 engaging with the extension 29. The inner end of the grain-boot is elongated, so as to insure the grain entering therein from the spout 11. There will be as many of these grain-boots as desired and they will be located any distance apart, according to the character of planting. For sowing seed in check-rows the grain-boots will be located so as to drop the seed the required distance corresponding to the spacing of the rows, and for sowing seed in drills the grain-boots will be provided at less distances apart, as will be readily understood. There will be a trip 30 for each side of the planter, and it consists of a bar curving longitudinally and having its end portions inwardly beveled, so as to engage with and operate the flap-valves without working injury thereto, and these bars are secured to the outer ends of curved arms, which are attached at their inner ends to the frame or axle of the planter.

The grain to be planted is placed in the hoppers and the latter are moved outward to throw the seed-dropping mechanism in gear, and as the machine is drawn over the field the grain is dropped into the upper ends of the lowermost grain-boots and is directed thereby to the ground, and is received in openings formed therein by means of the blades 26 and the end portions of the flap-valves. For check-row planting a furrow or line is provided at each end of the field, and in order to insure the alining of the rows it is necessary for the driver when starting at the end of the field to observe that the planting mechanism is about in the same position, and this result can be attained by throwing the seed-dropping mechanism out of gear and again into gear at the proper time, which will be readily effected after a little experience. If the ground-wheels are provided with a number of grain-boots, some of the cogs 22 are removed, thereby enabling only those desired to be brought into action. For planting in drills all the grain-boots are brought into action and no care need be observed by the driver for alining the machine such as required for planting in check-rows.

Having thus described the invention, what is claimed as new is—

1. In a planter, the combination with the frame, and a ground-wheel provided with cogs, of a hopper provided with seed-dropping mechanism comprising a plate having spurs projecting beyond the hopper to intermesh with the cogs of the ground-wheel, and slidingly mounted upon the frame and held thereon and guided in its movements thereby, and means for laterally shifting the hopper bodily toward and from the aforesaid ground-wheel to throw the seed-dropping mechanism into and out of mesh with the cogs of the ground-wheel, substantially as described.

2. In a planter, the combination of a frame, a ground-wheel having cogs, a plate secured to the frame and having an elongated opening, a hopper held to and slidingly mounted upon the said plate and having a pendent pin operating in the aforesaid elongated opening, a seed-plate between the hopper-bottom and base-plate and mounted upon the said pendent pin, and a lever having positive connection with the hopper and base-plate to shift the hopper laterally toward and from the ground-wheel, substantially as and for the purpose specified.

3. In a planter, the combination of a support provided with a discharge-opening and a series of clearing-openings, a hopper mounted upon the support, and a seed-dropping plate independent of and operating over the support and in the space formed between it and the bottom of the hopper, substantially as set forth.

4. In a planter, the combination of a support provided with a series of clearing-openings, a hopper mounted upon the support and a seed-dropping plate independent of and operating over the support and in the space formed between it and the bottom of the hopper and formed with a series of clearing-openings, substantially in the manner and for the purpose specified.

5. In a planter, the combination of a relatively stationary hopper, seed-dropping mechanism, a ground-wheel, housings applied to the spokes of the ground-wheel and forming therewith grain-boots which have their inner ends expanded in the direction of motion of the ground-wheel and successively brought beneath the hopper, blades fitted in notches in the side of the rim of the ground-wheel to come flush therewith and having their penetrating ends projecting beyond the tread-surface of the wheel, flap-valves provided with flanges at their longitudinal edges which have pivotal connection with ears applied to the aforesaid blades, and means for operating the flap-valves for effecting a proper discharge of the grain into the hills, substantially as described.

6. In a planter, the combination of a hopper having an arcuate slot or discharge-opening in its bottom and having a groove in the lower side of the bottom communicating with or forming a prolongation of the slot, a brush separating the slot from the groove, a seed-dropping plate arranged to operate beneath the bottom of the hopper and having the lower end of the said brush touching its top surface, and actuating mechanism for operating the seed-dropping plate, substantially as described.

In testimony that I claim the foregoing as my own I have hereto affixed my signature in the presence of two witnesses.

HENRY DAVID SMITH.

Witnesses:
J. A. FARMER,
JESSEE N. BOSANG.